US012245354B2

(12) United States Patent
Mehdi et al.

(10) Patent No.: US 12,245,354 B2
(45) Date of Patent: Mar. 4, 2025

(54) SWIRL CONTROL THROUGH ELECTRODE GEOMETRY

(71) Applicant: Hypertherm, Inc., Hanover, NH (US)

(72) Inventors: Faraz Mehdi, Hanover, NH (US); Yu Zhang, Hanover, NH (US); Steven Moody, Hanover, NH (US); Brenda Melius, Hanover, NH (US); Jesse Roberts, Hanover, NH (US); David J. Cook, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 116 days.

(21) Appl. No.: 17/560,824

(22) Filed: Dec. 23, 2021

(65) Prior Publication Data

US 2022/0210902 A1 Jun. 30, 2022

Related U.S. Application Data

(60) Provisional application No. 63/130,526, filed on Dec. 24, 2020.

(51) Int. Cl.
*H05H 1/34* (2006.01)

(52) U.S. Cl.
CPC ........ *H05H 1/3468* (2021.05); *H05H 1/3405* (2013.01)

(58) Field of Classification Search
CPC ....... H05H 1/3405; H05H 1/3468; H05H 1/34
See application file for complete search history.

(56) References Cited

U.S. PATENT DOCUMENTS

| | | | | |
|---|---|---|---|---|
| 4,782,210 A * | 11/1988 | Nelson | H05H 1/34 219/121.48 |
| D517,576 S | 3/2006 | Conway et al. | |
| 9,967,964 B2 | 5/2018 | Kim et al. | |
| 10,582,605 B2 | 3/2020 | Zhang et al. | |
| 2002/0117482 A1* | 8/2002 | Hewett | H05H 1/34 219/121.48 |
| 2015/0021302 A1* | 1/2015 | Zhang | H05H 1/34 219/121.52 |
| 2018/0228013 A1* | 8/2018 | Zhang | H05H 1/34 |
| 2022/0117482 A1 | 4/2022 | Chegini et al. | |

FOREIGN PATENT DOCUMENTS

| | | |
|---|---|---|
| WO | 2015009617 A2 | 1/2015 |
| WO | WO-2018/148495 A1 | 8/2018 |

* cited by examiner

*Primary Examiner* — Dana Ross
*Assistant Examiner* — Adam M Eckardt
(74) *Attorney, Agent, or Firm* — Cesari and McKenna, LLP

(57) ABSTRACT

A translatable electrode for use in a cartridge assembly for a contact start plasma arc torch including an electrode body having a longitudinal axis and including a proximal end and a distal end. The proximal end including a spiral groove and a contact surface at a proximal end face shaped to electrically communicate with a cathodic element. The translatable electrode also including at least one emissive insert disposed within the distal end of the electrode body and proximate a distal end face. The translatable electrode including at least one baffle disposed between the proximal and distal end of the electrode body. The translatable electrode also including a gas flow dampening region disposed circumferentially about the distal end and adjacent the distal end face and positioned between the at least one baffle and the distal end face.

21 Claims, 10 Drawing Sheets

SWIRL CONTROL THROUGH ELECTRODE GEOMETRY

CROSS REFERENCE TO RELATED APPLICATION

This application claims the benefit of and priority to U.S. Provisional Patent Application No. 63/130,526, filed Dec. 24, 2020, the entire contents of which are owned by the assignee of the instant application and incorporated herein by reference in their entirety.

FIELD OF THE INVENTION

The present invention relates generally to the field of plasma arc cutting systems and processes. More specifically, the invention relates to enhanced features for plasma arc torch electrodes.

BACKGROUND OF THE INVENTION

Material processing apparatus, such as torch systems (e.g., plasma torch systems) and lasers, are widely used in the welding, cutting, and marking of materials commonly known as workpieces. A typical plasma torch system can include elements such as an electrode and a nozzle having a central exit orifice mounted within a torch body, electrical connections, passages for cooling, passages for arc control fluids (e.g., plasma gas), and a power supply.

The plasma arc can be generated in various ways. For example, an arc can be generated between the electrode and the nozzle by means of any of a variety of contact starting methods. Contact start methods often involve establishing a physical contact and/or electrical communication between the electrode and the nozzle, and creating a current path between these two elements (the electrode and the nozzle).

The electrode and the nozzle are often arranged such that they define a portion of a plasma gas chamber within the torch body. The chamber is often arranged such that it can receive a pressurized gas (plasma gas). Gas pressure in the chamber can increase until it reaches a point at which the gas pressure is sufficient to separate the contact between the electrode and the nozzle. This separation causes a plasma arc to be generated between the electrode (cathode) and the nozzle (anode) in the plasma chamber. The plasma arc, typically, includes a constricted ionized jet of a gas with high temperature and high momentum. The arc ionizes the plasma gas to produce a plasma jet that can contact the workpiece and transfer the current flow to the work piece for material processing.

Certain components of a material processing device (e.g., plasma arc torch) can deteriorate over time from use. These components are referred to as "consumables." Typical torch consumables can include the electrode, swirl ring, nozzle, and shield. Increasing the swirl strength in the plasma chamber improves cut quality by shaping the arc. But it also causes more hafnium to be ejected (e.g., blown off) from the electrode during operation which results in lower life and higher torch failure rates. However, if the swirl strength is reduced, the life of the electrode and torch increase, but cut quality suffers.

SUMMARY OF THE INVENTION

Accordingly, an object of the invention is to provide systems and methods for improving electrode life while maintaining the cut quality of a plasma arc cutting system with high swirl strength. It is an object of the invention to provide an electrode having improved swirl control for use in a cartridge assembly for a contact start plasma arc torch. It is an object of the invention to provide an electrode having a gas flow dampening geometry for use in a cartridge assembly for a contact start plasma arc torch. It is an object of the invention to provide a cartridge assembly for a contact start plasma arc torch having an electrode with improved swirl control.

In some aspects, a translatable electrode for use in a cartridge assembly of a contact start plasma arc torch includes an electrode body having a longitudinal axis, a proximal end, and a distal end. The proximal end of the electrode body having a spiral groove and a contact surface at a proximal end face shaped to electrically communicate with a cathodic element. The translatable electrode also includes at least one emissive insert disposed within the distal end of the electrode body and proximate a distal end face. The translatable electrode includes at least one baffle disposed between the proximal end and the distal end of the electrode body. The translatable electrode also includes a gas flow dampening region disposed circumferentially about the distal end and adjacent the distal end face, and positioned between the at least one baffle and the distal end face.

In some embodiments, the distal end includes a step down region proximate the distal end face having a diameter smaller than a diameter of the distal end proximate the at least one baffle. For example, in some embodiments, the gas flow dampening region is disposed circumferentially about a perimeter of the step down region. In some embodiments, a step down length of the step down region is less than about 20% of a length of the electrode body. In some embodiments, the step down length of the step down region is about 15% of the length of the electrode body. In some embodiments, a spiral groove length of the spiral groove is about 30% of the length of the electrode body. In some embodiments, a ratio of the spiral groove length to the step down region is about 2.

In other embodiments, the gas flow dampening region includes channels parallel to the longitudinal axis of the electrode body. In some embodiments, the gas flow dampening region includes a knurled surface. For example, in some embodiments, the knurled surface is axially disposed on a cylindrical surface of the distal end. In other embodiments, the knurled surface terminates adjacent a contact start surface at the distal end face.

In some embodiments, the proximal end includes a distal facing surface configured to receive a pressure from a plasma plenum of the contact start plasma arc torch. In other embodiments, the translatable electrode is translatably fixed within a consumable cartridge.

In some aspects, a translatable electrode for use in a cartridge assembly for a contact start plasma arc torch includes an electrode body having a longitudinal axis, a proximal end, a distal end, and a flange disposed between the proximal end and the distal end. The proximal end including a spiral groove having a distal facing surface configured to receive a pressure from a plasma plenum of the contact start plasma arc torch. The distal end including at least one emissive insert disposed within the distal end and proximate a distal end face. The distal end also including a gas flow dampening region disposed circumferentially about the distal end and adjacent the distal end face.

In some embodiments, the distal end includes a step down region proximate the distal end face having a diameter smaller than a diameter of the distal end proximate the flange. For example, in some embodiments, the gas flow dampening region is disposed circumferentially about a perimeter of the step down region.

In other embodiments, the gas flow dampening region includes channels parallel to the longitudinal axis of the electrode body. In some embodiments, the spiral grooves include heat exchanger finds.

In other embodiments, the gas flow dampening region includes a knurled surface. For example, in some embodiments, the knurled surface terminates proximate a contact start surface at the distal end face.

In some aspects, a cartridge assembly for a contact start plasma arc torch includes an electrode, a nozzle having a contact start surface for electrical communication with the electrode, and a swirl ring including a substantially hollow elongated body dimensioned to receive the electrode. The electrode including an electrode body having a longitudinal axis, a proximal end, a distal end, and at least one baffle disposed between the proximal end and the distal end. The proximal end including a spiral groove and a contact surface at a proximal end face shaped to electrically communicate with a cathodic element. The distal end including at least one emissive insert disposed within the distal end and proximate a distal end face, and a gas flow dampening region disposed circumferentially about the distal end and adjacent the distal end face.

In some embodiments, the nozzle is dimensioned to receive the electrode, the electrode and nozzle together defining a plasma chamber. In other embodiments, the swirl ring includes channels creating a gas flow with a first swirl strength, the gas flow dampening region decreasing a magnitude of the first swirl strength to a second swirl strength.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for improving electrode life while maintaining the cut quality of a plasma arc cutting system. The systems and methods can include an electrode having improved swirl control for use in a cartridge assembly for a contact start plasma arc torch. The systems and methods can include an electrode having a gas flow dampening geometry for use in a cartridge assembly for a contact start plasma arc torch. The systems and methods can include an electrode having a gas flow dampening geometry shaped to dampen swirl flow in a localized region(s) of the electrode (e.g., proximate the tip of the electrode, proximate an emissive insert (e.g., hafnium insert) of the electrode, etc.). The systems and methods can include a cartridge assembly for a contact start plasma arc torch having an electrode with improved swirl control.

Increasing the swirl strength in the plasma chamber improves cut quality by shaping the arc. But it also causes more hafnium to be ejected from the electrode during operation which results in lower life and higher torch failure rates. However, if the swirl strength is reduced, the life of the electrode and cartridge increase, but the quality suffers. These two life and quality factors which seem to be opposed to one another are addressed/improved by modifying the electrode geometry itself. For example, by adding baffles to the electrode, the swirl is increased overall, and by knurling just the tip of the electrode, the local swirl is disrupted in the vicinity of the emissive insert (e.g., hafnium) resulting in improved life via reduced hafnium ejection. In some embodiments, the swirl strength is determined by the offset of the swirl holes in the swirl ring. In the case of a plasma arc cartridge embodiment, swirl holes can be slots molded into the swirl ring itself. Testing shows that, in some embodiments, about a 0.06" offset produces a weaker swirl and longer electrode life, but poorer cut quality. In other embodiments, an offset of about 0.15" improves the cut quality but with decreased electrode life.

Figure 1:
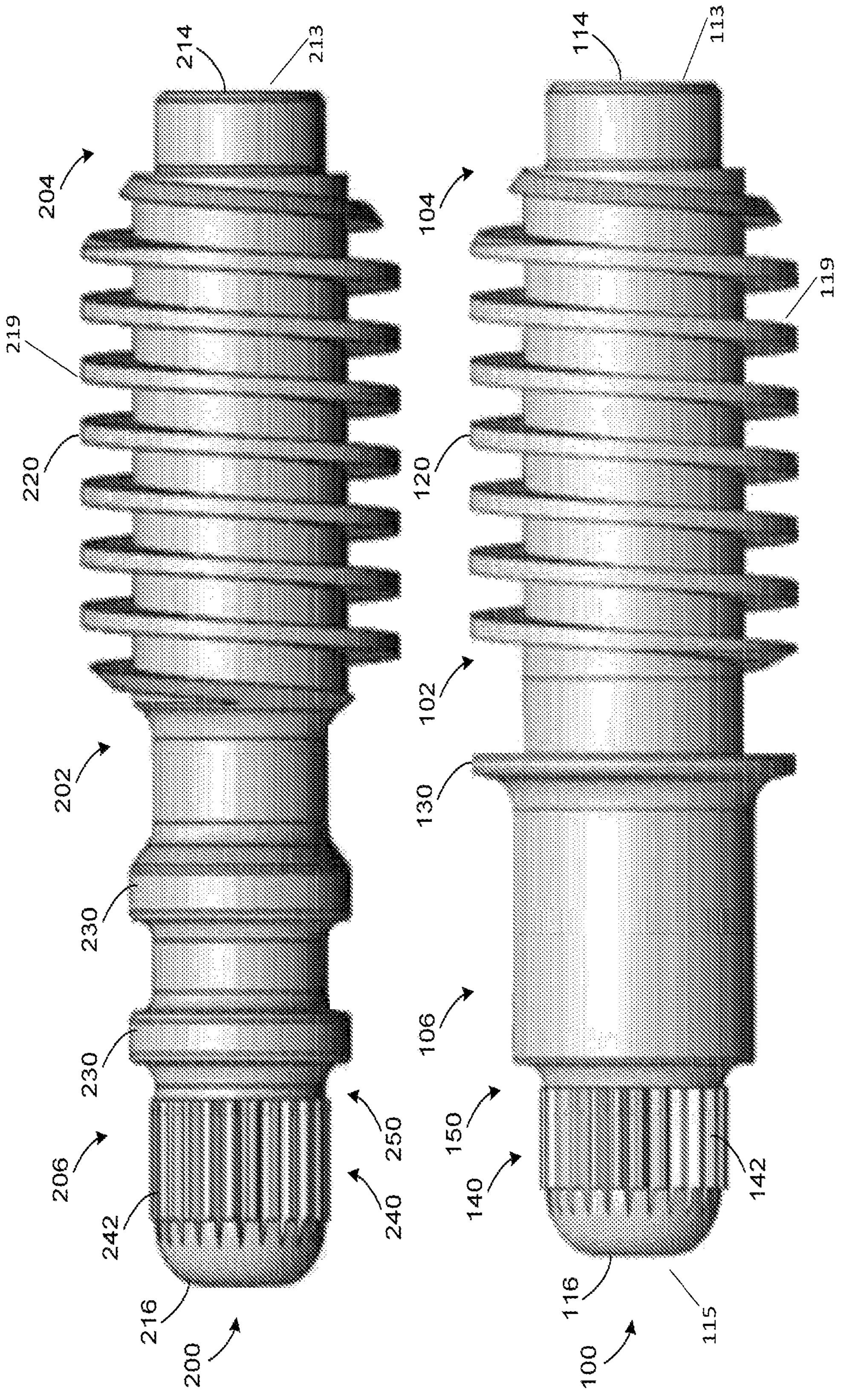
FIG. 1 is an illustrative side view of two exemplary electrodes, according to an embodiment of the invention.
Figure 2:
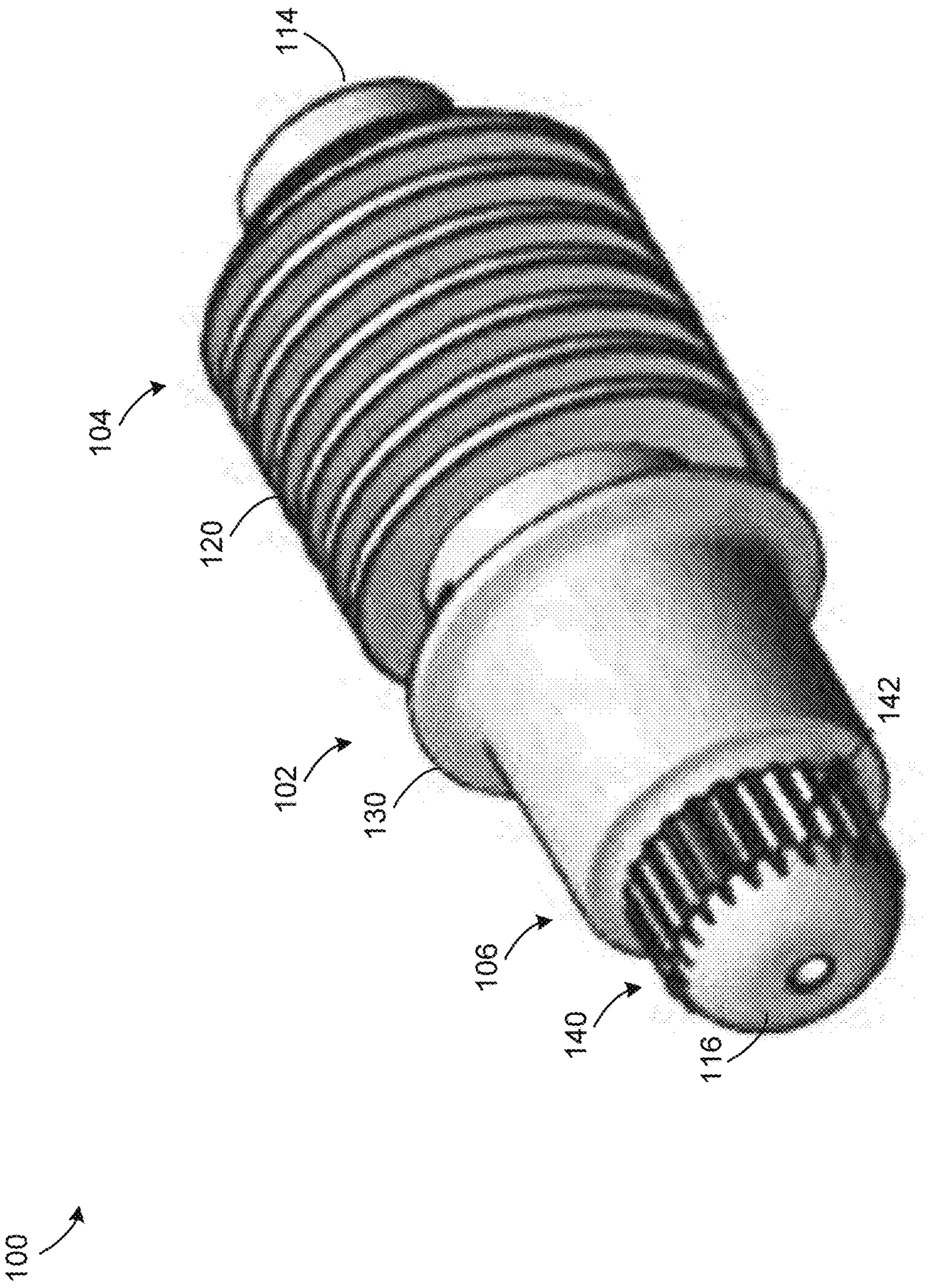
FIG. 2 is an illustrative perspective view of an exemplary electrode for high amperage applications, according to an embodiment of the invention.
Figure 3:
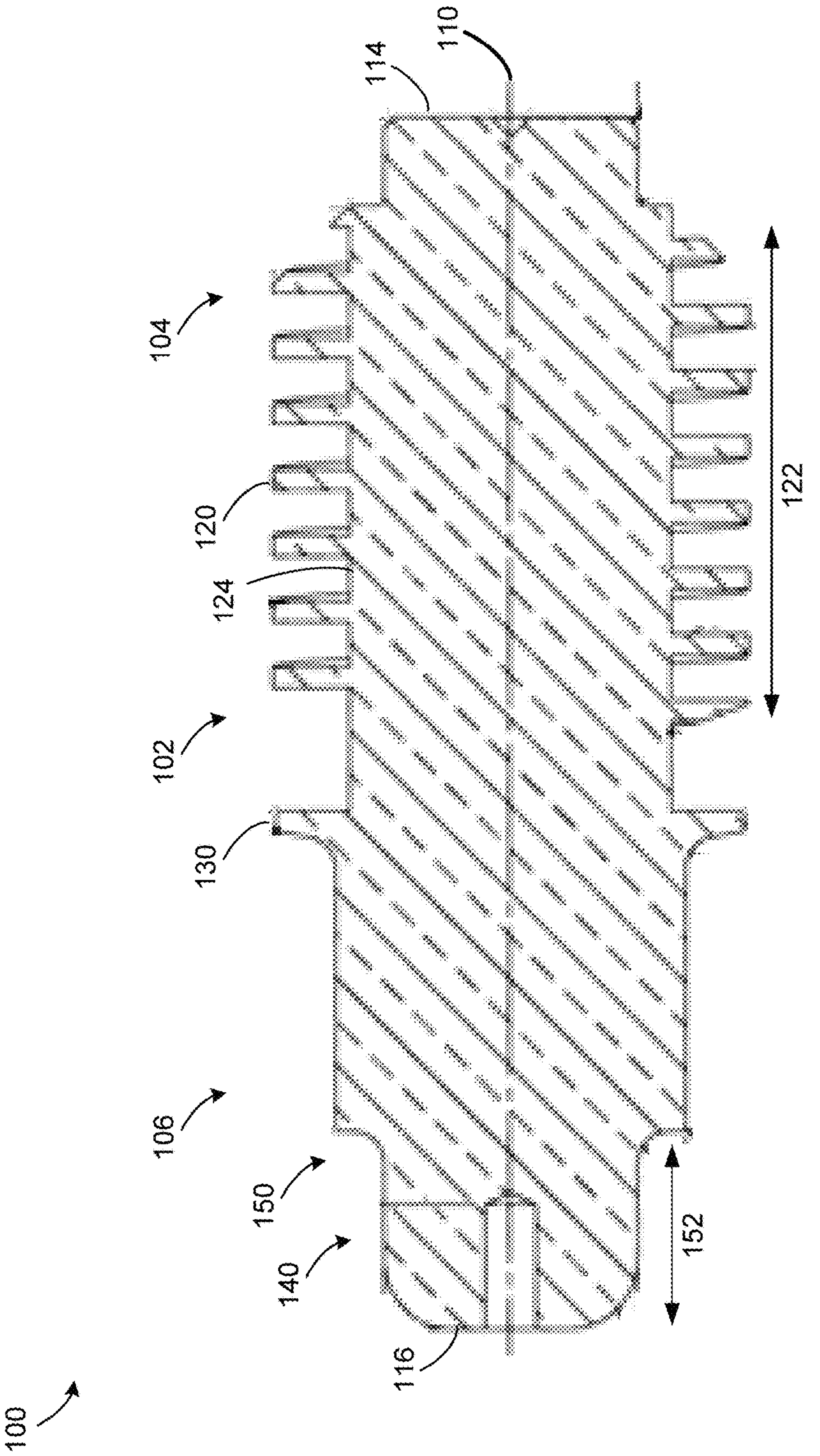
FIG. 3 is an illustrative cross-section of the exemplary electrode shown in FIG. 2, according to an embodiment of the invention.

The systems and methods described herein address these conflicting design criteria by allowing a strong swirl around the body of the electrode and then decreasing the swirl strength at the tip proximate the hafnium. As mentioned above, the swirl strength around the body can be increased by increasing the offset of the swirl holes or swirl slots. The swirl strength around the tip may be decreased by adjusting the geometry and/or shape of the electrode (e.g., adding a knurling feature on the sides of the tip of the electrode) immediately adjacent the face where the hafnium bore is located. For example, in some embodiments, the knurling feature on the sides of the tip of the electrode is substantially perpendicular to the face where the hafnium bore is located. These features can be seen in FIG. 1, illustrating two electrode embodiments 100 and 200 of the invention. In some embodiments, the knurling can be used in combination with a baffles or a spiral groove for cooling. In some embodiments, the knurling comprises ridging, texturing, and/or pocketing. In some embodiments, the depth of the knurling feature can range between about 0.004" and about 0.06", with some embodiments between about 0.006" and about 0.05".

The electrode embodiments described herein are specifically designed to be used in conjunction with a plasma arc cartridge. The cartridge is designed such that when a single component of the cartridge reaches the end of life, the entire cartridge is discarded. Such a cartridge design requires an extremely high reliability of each individual component since the components cannot be individually replaced as with traditional consumable parts in a plasma arc torch. Arc strength and parameters can change as the operational amperage value changes and as such some embodiments may be better for certain amperages and not others. For example, in some embodiments, electrode 100, illustrated in FIGS. 1-4, can be suitable for operation at higher amperages (e.g., about 90 Amp and higher). In contrast, in some embodiments, electrode 200, illustrated in FIGS. 1 and 5-7, can be suitable for operation at lower amperages (e.g., about 80 Amp and lower). Finally, in some embodiments, electrode 300, illustrated in FIGS. 8-10, can be suitable for specialty applications, such as gouging and fine cut operations.

As mentioned above, some embodiments of the invention incorporate two features—i) a baffle (or baffles) intended to divert a portion of the axial flow component to the tangential direction, and ii) a knurl at the tip intended to reduce the local swirl close to the hafnium. The advantage(s) of combining these two features is to have a very high swirl to shape the arc thus facilitating better cut surface/results, and yet forcing a low swirl in the local region near the hafnium and thus facilitating longer life and lower torch failure rates. In some embodiments, this knurling produces a layer of axial flow proximate the electrode tip and hafnium insert with reduced swirl which is surrounded by another layer of axial flow (not substantially exposed to the knurling) with strong swirl, this inner reduced swirl layer protecting/shielding the insert to exposure to the high swirl.

Referring to FIGS. 1-4, a translatable electrode 100 for use in a cartridge assembly 190 for a contact start plasma arc torch is illustrated. The cartridge assembly 190 includes a nozzle 180 having a contact start surface for electrical communication with the electrode and a swirl ring 182 having a substantially hollow elongated body dimensioned to receive the translatable electrode 100. In some embodiments, the nozzle 180 is dimensioned to receive the translatable electrode 100, the translatable electrode 100 and nozzle 180 together defining a plasma chamber 184.

The translatable electrode 100 includes an electrode body 102 having a longitudinal axis 110, a proximal end 104, and a distal end 106. In some embodiments, the translatable electrode is translatably fixed within a consumable cartridge. As shown, the proximal end 104 of the electrode body 102 includes a spiral groove 120 for cooling enhancement, and a contact surface 113 at a proximal end face 114 shaped to electrically communicate with a cathodic element 192. In some embodiments, the spiral groove includes heat exchanger fins 119. In some embodiments, the proximal end 104 of the electrode body 102 includes a distal facing surface configured to receive a pressure from a plasma plenum of the contact start plasma arc torch. For example, in some embodiments, the pressure from the plasma plenum is reduced as gas travels through the spiral groove 120 to the proximal end face 114.

The translatable electrode 100 also includes at least one emissive insert disposed within the distal end 106 of the electrode body 102 and proximate a distal end face 116. Further, the translatable electrode 100 includes at least one baffle 130 disposed between the proximal end 104 and the distal end 106 of the electrode body 102. The at least one baffle 130 is located in the middle (far back from the hafnium and proximate the spiral groove 120) to distribute the airflow. The swirling air enters the cartridge forward of the at least one baffle 130 and moves towards the distal end 106 of the electrode body 102. A portion of the cooling gas flows over the at least one baffle 130 and into the spiral groove 120.

The translatable electrode 100 includes a gas flow dampening region 140 circumferentially about the distal end 106 of the electrode body 102 and adjacent the distal end face 116, and positioned between the at least one baffle 130 and the distal end face 116. In some embodiments, the swirl ring 182 of the cartridge assembly 190 includes channels 183 creating a gas flow with a first swirl strength. In some embodiments, the gas glow dampening region 140 decreases a magnitude of the first swirl strength to a second swirl strength.

In some embodiments, the distal end 106 of the electrode body includes a step down region 150 proximate the distal end face 116 having a diameter smaller than a diameter of the distal end 106 proximate the at least one baffle 130. For example, in some embodiments, the gas flow dampening region 140 is disposed circumferentially about a perimeter of the step down region 150. In some embodiments, a step down length 152 of the step down region 150 is less than about 20% of a length of the electrode body 102. For example, in some embodiments, the step down length 152 of the step down region 150 is about 15% of the length of the electrode body 102. In some embodiments, a spiral groove length 122 of the spiral groove 120 is about 30% of the length of the electrode body 102. For example, in some embodiments, a ratio of the spiral groove length 122 to the step down length 152 is about two.

In some embodiments, the gas flow dampening region 140 includes channels 142 parallel to the longitudinal axis 110 of the electrode body 102. For example, in some embodiments, the gas flow dampening region 140 includes a knurled surface. The knurled surface is configured to locally reduce the swirl around the hafnium. In some embodiments, the knurled surface is axially disposed on a cylindrical surface of the distal end 106 of the electrode body 102. In other embodiments, the knurled surface terminates adjacent a contact start surface 115 at the distal end face 116.

In some embodiments, the diameter of the electrode body 102 forward of the at least one baffle 130 is larger than the diameter(s) of the base 124 of the spiral grooves 120. This large diameter forces the gas moving towards the distal end 106 to mix more uniformly prior to reaching the gas flow dampening region 140. The different diameters of the electrode body 102 can most clearly be seen in the cross-section of FIG. 3 where the electrode body 102 is thickest just forward of the at least one baffle 130, thinnest proximate the distal end face 116, and in between in thickness at the base of the spiral grooves 120.

Figure 4:
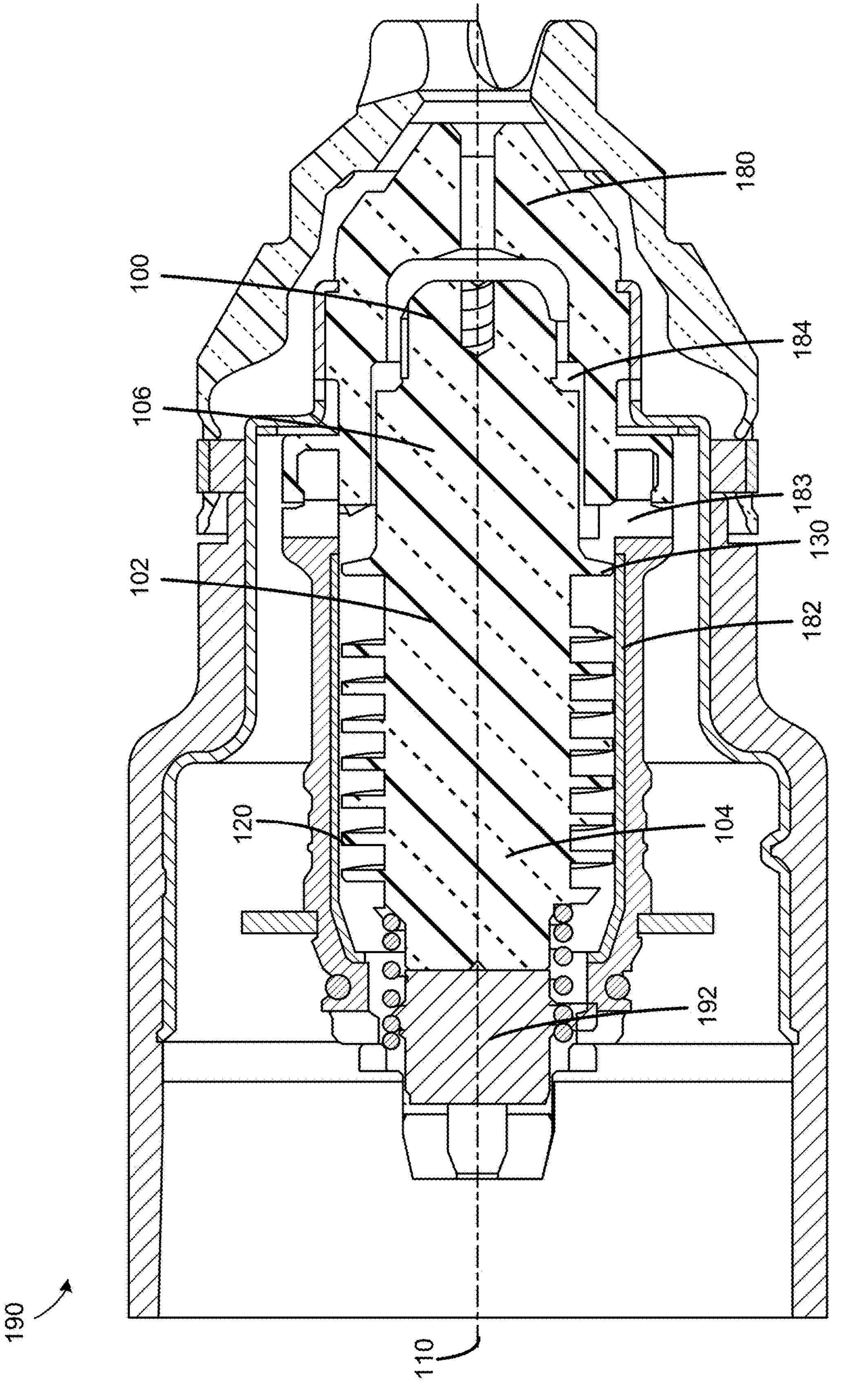
FIG. 4 is an illustrative cross-section of the exemplary electrode shown in FIG. 2 disposed within a plasma arc cartridge, according to an embodiment of the invention.
Figure 5:
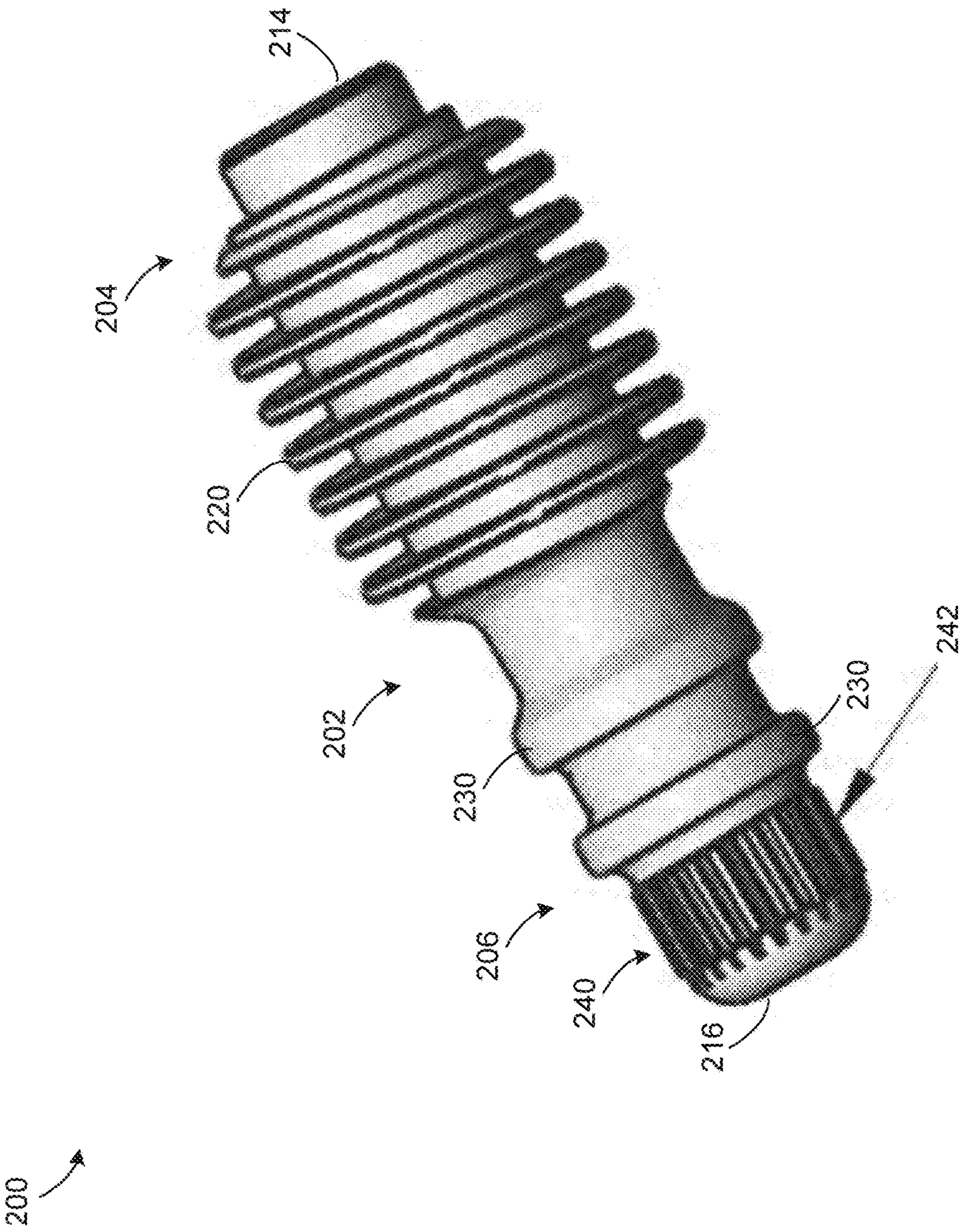
FIG. 5 is an illustrative perspective view of an exemplary electrode for low amperage applications, according to an embodiment of the invention.
Figure 6:
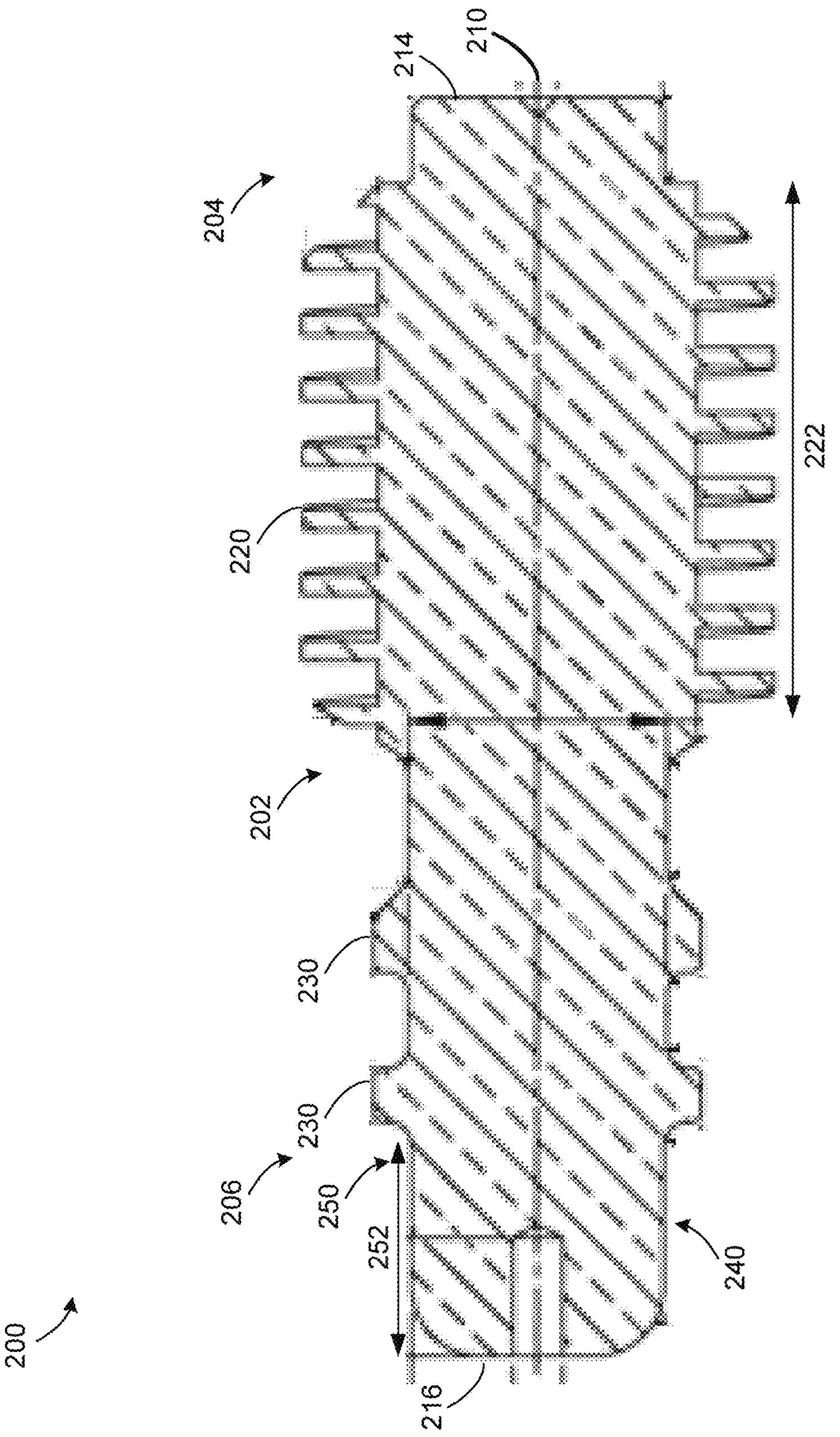
FIG. 6 is an illustrative cross-section of the exemplary electrode shown in FIG. 5, according to an embodiment of the invention.
Figure 7:
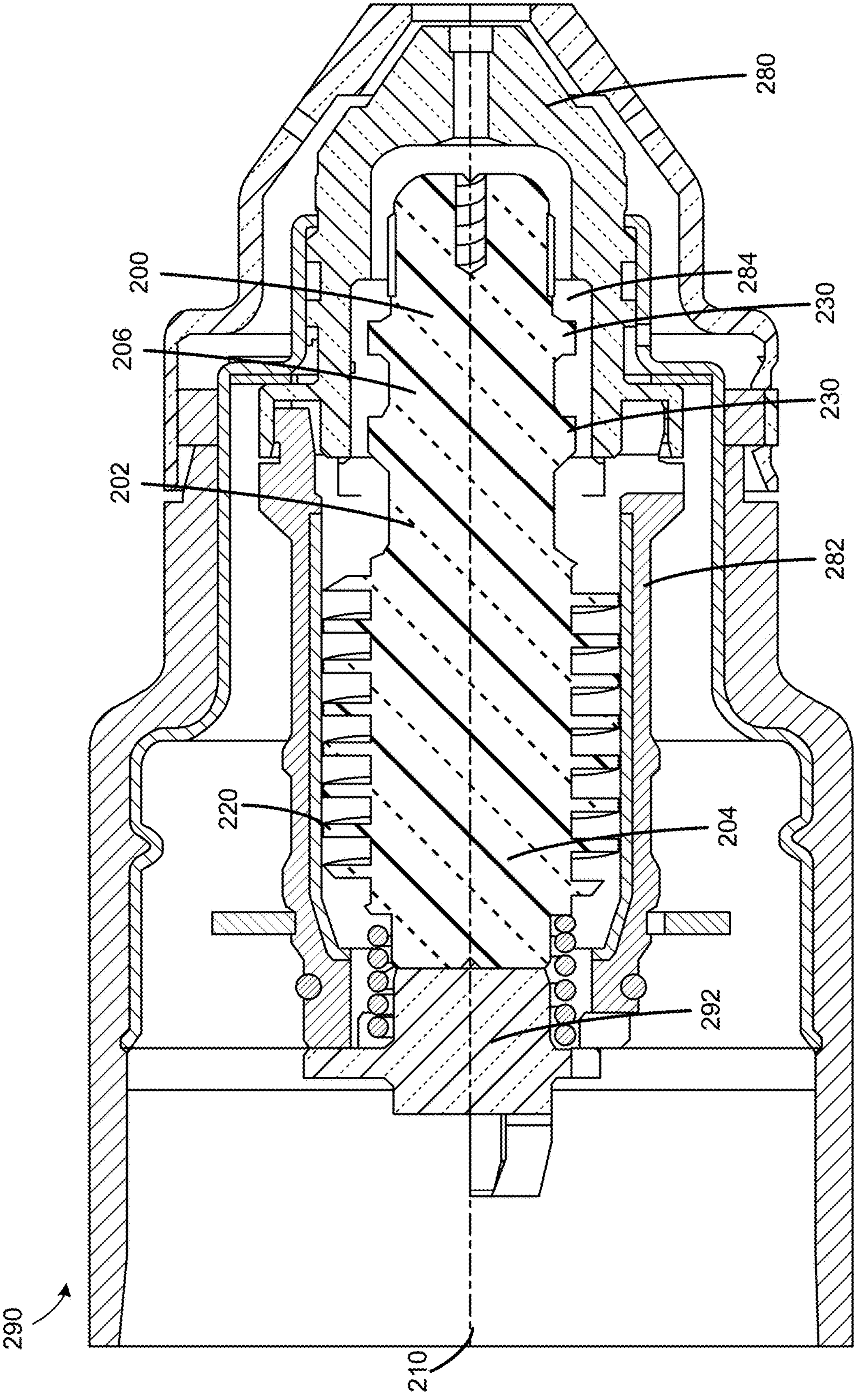
FIG. 7 is an illustrative cross-section of the exemplary electrode shown in FIG. 5 disposed within a plasma arc cartridge, according to an embodiment of the invention.

Referring to FIG. 4, in some embodiments, the interior diameter of the nozzle 180 has a diameter that decreases going down toward the bore to complement the diameter of the step down region 150 of the translatable electrode 100 and maintain proper spacing between the two components. In some embodiments, the step in the interior of the nozzle 180 aligns with a step in the diameter with the translatable electrode 100. These two steps can be slightly offset to create a chamber which further allows plasma gas to mix just prior to reaching the distal tip of the translatable electrode 100. This mixing can occur prior to the gas swirl being dampened by the gas flow dampening region 140 which begins just after/forward of this chamber.

In some embodiments, the cross-sectional diametric dimension of the gas flow dampening region 140 is between about 0.2" and 0.3". In some embodiments, the cross-sectional diametric dimension of the gas flow dampening region 140 is between about 0.225" and 0.275". In some embodiments, the cross-sectional diametric dimension of the distal end 106 proximate the at least one baffle 130 is between about 0.3" and 0.4". In some embodiments, the cross-sectional diametric dimension of the distal end 106 proximate the at least one baffle 130 is between about 0.325" and 0.375". In some embodiments, the cross-sectional diametric dimension of the base of the spiral groove 120 is between about 0.25" and 0.4". In some embodiments, the cross-sectional diametric dimension of the base of the spiral groove 120 is between about 0.3" and 0.35". In some embodiments, the cross-sectional diametric dimension of the base of the spiral groove 120 is about 0.325".

Referring to FIGS. 1 and 5-7, a translatable electrode 200 for use in a cartridge assembly 290 for a contact start plasma arc torch is illustrated. As mentioned above, translatable electrode 200 is suitable for cutting currents below about 80 amps. The cartridge assembly 290 includes a nozzle 280 having a contact start surface for electrical communication with the electrode and a swirl ring 282 having a substantially hollow elongated body dimensioned to receive the translatable electrode 200. In some embodiments, the nozzle 280 is dimensioned to receive the translatable electrode 200, the translatable electrode 200 and nozzle 280 together defining a plasma chamber 284.

The translatable electrode 200 includes an electrode body 202 having a longitudinal axis 210, a proximal end 204, and a distal end 206. In some embodiments, the translatable electrode is translatably fixed within a consumable cartridge. As shown, the proximal end 204 of the electrode body 202 includes a spiral groove 220 for cooling enhancement, and a contact surface 213 at a proximal end face 214 shaped to electrically communicate with a cathodic element 292. In some embodiments, the spiral groove includes heat exchanger fins 219. In some embodiments, the proximal end 204 of the electrode body 202 includes a distal facing surface configured to receive a pressure from a plasma plenum of the contact start plasma arc torch. For example, in some embodiments, the pressure from the plasma plenum is reduced as gas travels through the spiral groove 220 to the proximal end face 214. The translatable electrode 200 also includes at least one emissive insert disposed within the distal end 206 of the electrode body 202 and proximate a distal end face 216.

Further, in contrast with translatable electrode 100, the translatable electrode 200 includes at least two baffles 230 disposed between the proximal end 204 and the distal end 206 of the electrode body 202, and are located more forward/proximate the hafnium and distal end face 216. The translatable electrode 200 includes a gas flow dampening region 240 circumferentially about the distal end 206 of the electrode body 202 and adjacent the distal end face 216, and positioned between the at least two baffles 230 and the distal end face 216. During operation of this embodiment, the gas enters rearward of the at least two baffles 230 and then flows forward toward the gas flow dampening region 240. Similar to cartridge assembly 190, the nozzle 280 of cartridge assembly 290 includes a step to create a mixing chamber between the forward most baffle 230 and the step, prior to the gas flow dampening region 240. The translatable electrode 200 of this embodiment has more consistent cross-sectional diametric values.

Figure 8:
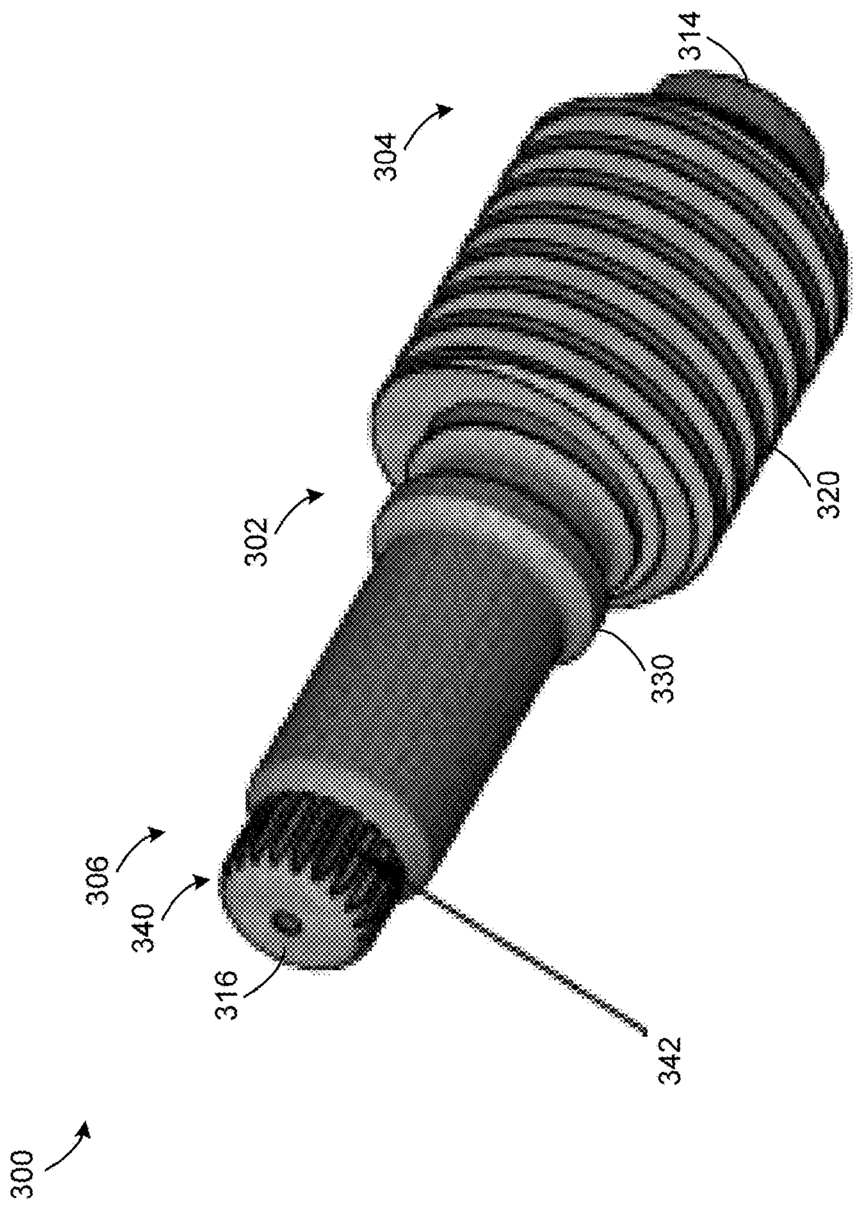
FIG. 8 is an illustrative perspective view of an exemplary electrode for specialty applications, according to an embodiment of the invention.
Figure 9:
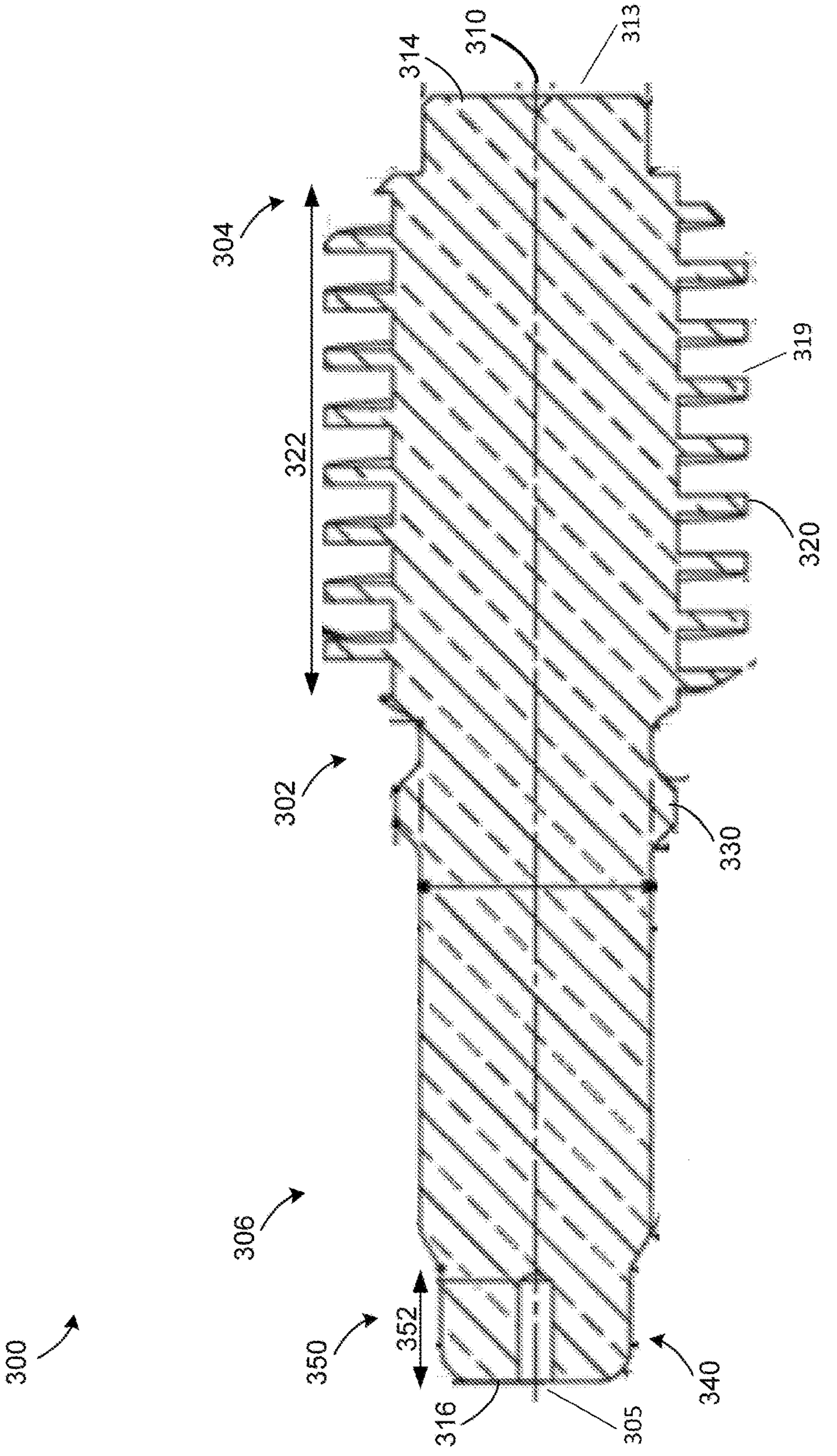
FIG. 9 is an illustrative cross-section of the exemplary electrode shown in FIG. 8, according to an embodiment of the invention.
Figure 10:
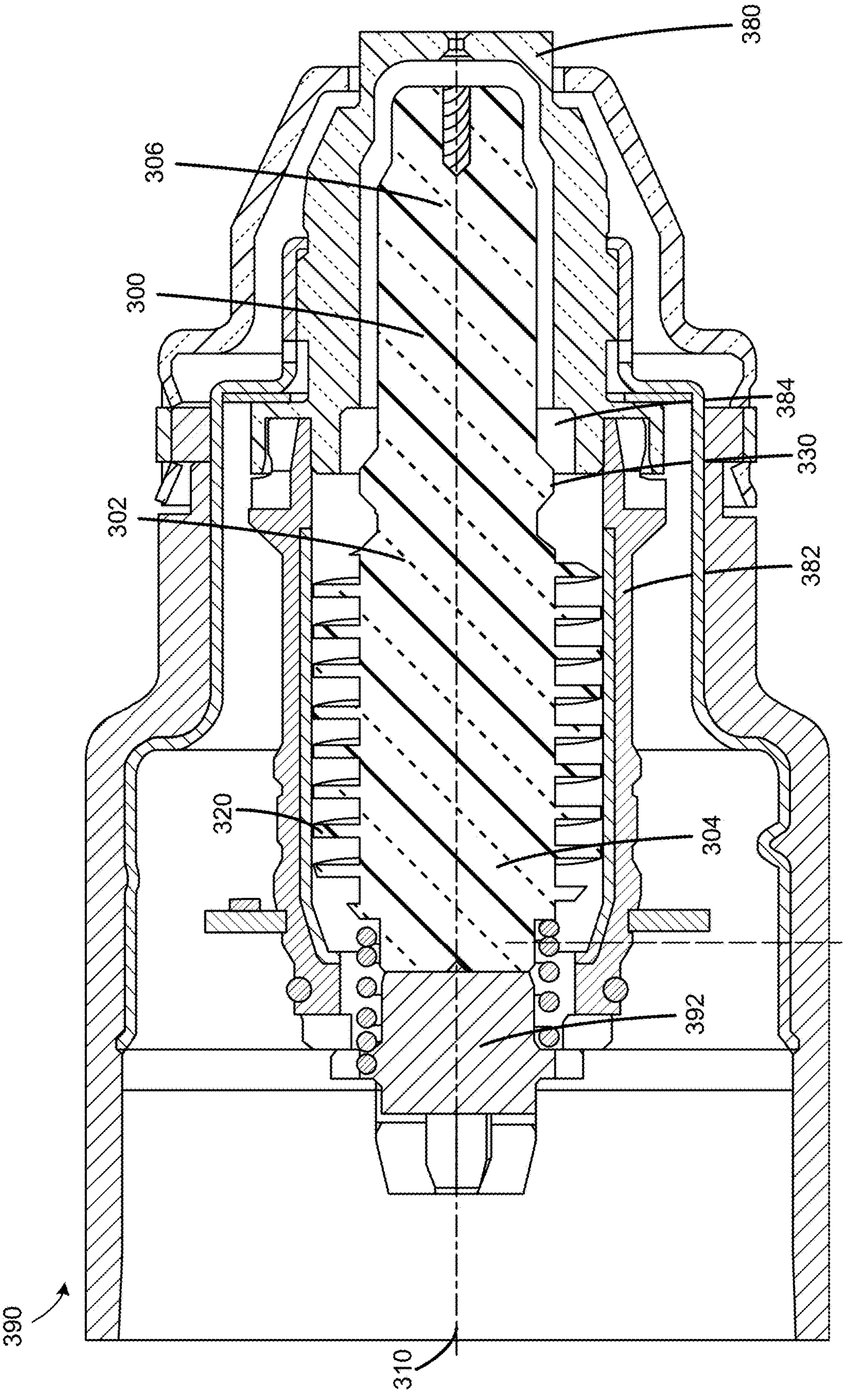
FIG. 10 is an illustrative cross-section of the exemplary electrode shown in FIG. 8 disposed within a plasma arc cartridge, according to an embodiment of the invention.

Referring to FIGS. 8-10, a translatable electrode 300 for use in a cartridge assembly 390 for a contact start plasma arc torch is illustrated. As mentioned above, translatable electrode 300 is suitable for specialty applications, such as gouging and fine cut operations. The cartridge assembly 390 includes a nozzle 380 having a contact start surface for electrical communication with the electrode and a swirl ring 382 having a substantially hollow elongated body dimensioned to receive the translatable electrode 300. In some embodiments, the nozzle 380 is dimensioned to receive the translatable electrode 300, the translatable electrode 300 and nozzle 380 together defining a plasma chamber 384.

The translatable electrode 300 includes an electrode body 302 having a longitudinal axis 310, a proximal end 304, and a distal end 306. In some embodiments, the translatable electrode is translatably fixed within a consumable cartridge. As shown, the proximal end 304 of the electrode body 302 includes a spiral groove 320 for cooling enhancement, and a contact surface 313 at a proximal end face 314 shaped to electrically communicate with a cathodic element 392. In some embodiments, the spiral groove includes heat exchanger fins 319. In some embodiments, the proximal end 304 of the electrode body 302 includes a distal facing surface configured to receive a pressure from a plasma plenum of the contact start plasma arc torch. For example, in some embodiments, the pressure from the plasma plenum is reduced as gas travels through the spiral groove 320 to the proximal end face 314. The translatable electrode 300 also includes at least one emissive insert 305 disposed within the distal end 306 of the electrode body 302 and proximate a distal end face 316.

Further, in contrast with translatable electrodes 100 and 200, the translatable electrode 300 includes a flange 330 generally midway down the length of the electrode body 302 (e.g., distant relative to the distal end face 316 and proximate the spiral groove 320) along with the spiral groove 320. The translatable electrode 300 includes a gas flow dampening region 340 circumferentially about the distal end 306 of the electrode body 302 and adjacent the distal end face 316, and positioned between the flange 330 and the distal end face 316. The distal end 306 includes a decreased diameter portion proximate the hafnium, which is where the gas flow dampening region 340 is circumferentially about. During operation of this embodiment, the gas comes in to contact with the electrode 300 generally rearward of the flange 330 with part of the gas moving forward towards the plasma plenum and part of the gas moving rearward through the spiral groove 320. The associated nozzle 380 likewise has a step in it which works in conjunction with the flange 330 and electrode 300 to create a mixing chamber for the plasma gas prior to the gas flow dampening region 340.

The systems and methods described herein provide a number of benefits over the current state of the art. It is understood that the concepts of the invention may be practiced alone or in any combination and include but are not limited to the exemplary embodiments described herein which include: the ability to have different levels of swirl strength in different regions of the plasma chamber; varying the electrode diameter across its length to influence and impact the plenum and cooling flows; introducing knurling and/or textured surface proximate the electrode tip to impact the plenum flow; locating a baffle and/or baffles about the electrode to separate and direct gas flows about the electrode; adjusting the spacing, ratio(s), or magnitude of these features to impact gas flows; designing/including a complementary nozzle to define a mixing chamber between the electrode and nozzle (e.g., a step in the nozzle and/or electrode) proximate the tip of the electrode/plenum.

One skilled in the art will realize the invention can be embodied in other specific forms without departing from the spirit or essential characteristics thereof. The foregoing embodiments are therefore to be considered in all respects illustrative rather than limiting of the invention described herein. It will be appreciated that the illustrated embodiments and those otherwise discussed herein are merely examples of the invention and that other embodiments, incorporating changes thereto, including combinations of the illustrated embodiments, fall within the scope of the invention.

What is claimed:

1. A translatable electrode for use in a cartridge assembly for a contact start plasma arc torch, the electrode comprising:

- an electrode body having a longitudinal axis and comprising a proximal end and a distal end;
- the proximal end comprising a spiral groove and a contact surface at a proximal end face, the proximal end shaped to electrically communicate with a cathodic element;
- at least one emissive insert disposed within the distal end of the electrode body and proximate a distal end face;
- at least one baffle disposed between the proximal and the distal end of the electrode body; and
- a gas flow dampening region disposed circumferentially about the distal end and adjacent the distal end face and positioned between the at least one baffle and the distal end face, the gas flow dampening region having a knurling feature that includes at least on of ridging, texturing, pocketing, and channels substantially parallel to the longitudinal axis, the knurling feature dampening swirl flow at a tip of the electrode to reduce a hafnium loss of the emissive insert.

2. The translatable electrode of claim 1, wherein the gas flow dampening region comprises a plurality of channels parallel to the longitudinal axis of the electrode body.

3. The translatable electrode of claim 1, wherein the distal end comprises a step down region proximate the distal end face having a diameter smaller than a diameter of the distal end proximate the at least one baffle.

4. The translatable electrode of claim 3, wherein the gas flow dampening region is disposed circumferentially about a perimeter of the step down region.

5. The translatable electrode of claim 3, wherein a step down length of the step down region is less than about 20% of a length of the electrode body.

6. The translatable electrode of claim 5, wherein the step down length of the step down region is about 15% of the length of the electrode body.

7. The translatable electrode of claim 6, wherein a spiral groove length of the spiral groove is about 30% of the length of the electrode body.

8. The translatable electrode of claim 7, wherein a ratio of the spiral groove length to the step down length is about 2.

9. The translatable electrode of claim 1, wherein the knurling feature is axially disposed on a cylindrical surface of the distal end.

10. The translatable electrode of claim 1, wherein the knurling feature terminates adjacent a contact start surface at the distal end face.

11. The translatable electrode of claim 1, wherein the proximal end comprises a distal facing surface configured to receive a pressure from a plasma plenum of the contact start plasma arc torch.

12. The translatable electrode of claim 1, wherein the translatable electrode is translatably fixed within a consumable cartridge.

13. A translatable electrode for use in a cartridge assembly for a contact start plasma arc torch, the electrode comprising:

- an electrode body having a longitudinal axis and comprising a proximal end, a distal end, and a flange disposed between the proximal end and the distal end;
- the proximal end comprising a spiral groove having a distal facing surface configured to receive a pressure from a plasma plenum of the contact start plasma arc torch; and
- the distal end comprising:
  - at least one emissive insert disposed within the distal end and proximate a distal end face; and
  - a gas flow dampening region disposed circumferentially about the distal end and adjacent the distal end face, the gas flow dampening region having a knurling feature that includes at least one of ridging, texturing, pocketing, and channels substantially parallel the longitudinal axis, the knurling feature damping swirl flow at a tip of the electrode to reduce a hafnium loss.

14. The translatable electrode of claim 13, wherein the gas flow dampening region comprises a plurality of channels parallel to the longitudinal axis of the electrode body.

15. The translatable electrode of claim 13, wherein the distal end comprises a step down region proximate the distal end face having a diameter smaller than a diameter of the distal end proximate the flange.

16. The translatable electrode of claim 15, wherein the gas flow dampening region is disposed circumferentially about a perimeter of the step down region.

17. The translatable electrode of claim 13, wherein the knurling feature terminates proximate a contact start surface at the distal end face.

18. The translatable electrode of claim 13, wherein the spiral groove comprises heat exchanger fins.

19. A cartridge assembly for a contact start plasma arc torch, the cartridge assembly comprising:

- an electrode comprising:
  - an electrode body having a longitudinal axis and comprising a proximal end, a distal end, and at least one baffle disposed between the proximal end and the distal end;
  - the proximal end comprising a spiral groove and a contact surface at a proximal end face shaped to electrically communicate with a cathodic element; and
  - the distal end comprising:
    - at least one emissive insert disposed within the distal end and proximate a distal end face; and
    - a gas flow dampening region disposed circumferentially about the distal end and adjacent the distal end face, the gas flow dampening region having a knurling feature that includes at least one of ridging, texturing, pocketing, and channels substantially parallel the longitudinal axis, the knurling feature damping swirl flow at a tip of the electrode to reduce a hafnium loss;
- a nozzle having a contact start surface for electrical communication with the electrode; and a swirl ring comprising a substantially hollow elongated body dimensioned to receive the electrode.

20. The cartridge assembly of claim 19, wherein the nozzle is dimensioned to receive the electrode, the electrode and nozzle together defining a plasma chamber.

21. The cartridge assembly of claim 19, wherein the swirl ring comprises a plurality of channels creating a gas flow with a first swirl strength, the gas flow dampening region decreasing a magnitude of the first swirl strength to a second swirl strength.

* * * * *